United States Patent [19]

Ong et al.

[11] Patent Number: 4,999,155
[45] Date of Patent: Mar. 12, 1991

[54] METHOD FOR FORMING POROUS OXIDE DISPERSION STRENGTHENED CARBONATE FUEL CELL ANODES WITH IMPROVED ANODE CREEP RESISTANCE

[75] Inventors: Estela T. Ong; Diane S. Erickson, both of Chicago; Leonard G. Marianowski, Mt. Prospect, all of Ill.

[73] Assignee: Electric Power Research Institute, Inc., Palo Alto, Calif.

[21] Appl. No.: 422,998

[22] Filed: Oct. 17, 1989

[51] Int. Cl.$^5$ .............................................. B22F 5/00
[52] U.S. Cl. .......................................... 419/2; 419/19; 419/21; 148/426; 148/DIG. 117
[58] Field of Search ............................... 419/2, 19, 21

[56] References Cited

U.S. PATENT DOCUMENTS

| 3,525,609 | 8/1970 | Roberts | 75/153 |
| 3,578,443 | 5/1971 | Grant et al. | 75/206 |
| 4,315,777 | 2/1982 | Nadkarni et al. | 75/232 |
| 4,594,217 | 6/1986 | Samal | 419/3 |
| 4,654,195 | 3/1987 | Wnuck et al. | 419/2 |
| 4,659,379 | 4/1987 | Singh et al. | 75/234 |
| 4,714,586 | 12/1987 | Swann et al. | 419/2 |

Primary Examiner—Stephen J. Lechert, Jr.
Attorney, Agent, or Firm—Flehr, Hohbach, Test, Albritton & Herbert

[57] ABSTRACT

The present invention is directed to a method for forming porous oxide dispersion strengthened molten carbonate fuel cell anodes having improved anode creep resistance. The method comprises the steps of forming an alloy powder comprised of a base metal and an alloy metal, forming the alloy into a porous anode structure by sintering, and then placing the porous anode structure under conditions in which the base metal is reduced and the alloy metal is oxidized, thereby internally oxidizing the alloy metal to form oxide particles therein. Alternatively, the method of the present invention can comprise the steps of forming an alloy powder comprised of a base metal and an alloy metal, placing the alloy powder under conditions wherein the powder is oxidized only on its surface, thereby forming oxides of both the base metal and the alloy metal, and forming the oxidized alloy powder into a porous anode structure by simultaneous sintering and internally oxidizing the remaining unoxidized alloy metal by an oxygen exchange reaction between the base metal oxide the internal alloy metal.

20 Claims, 3 Drawing Sheets

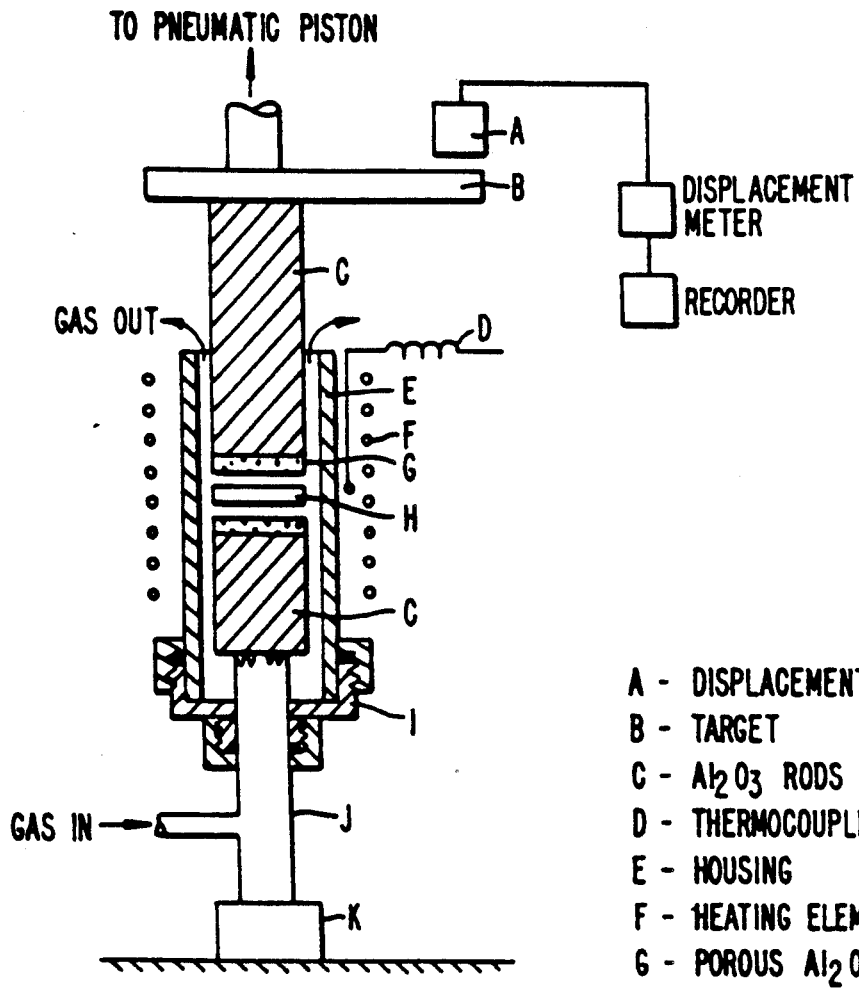
FIG._1

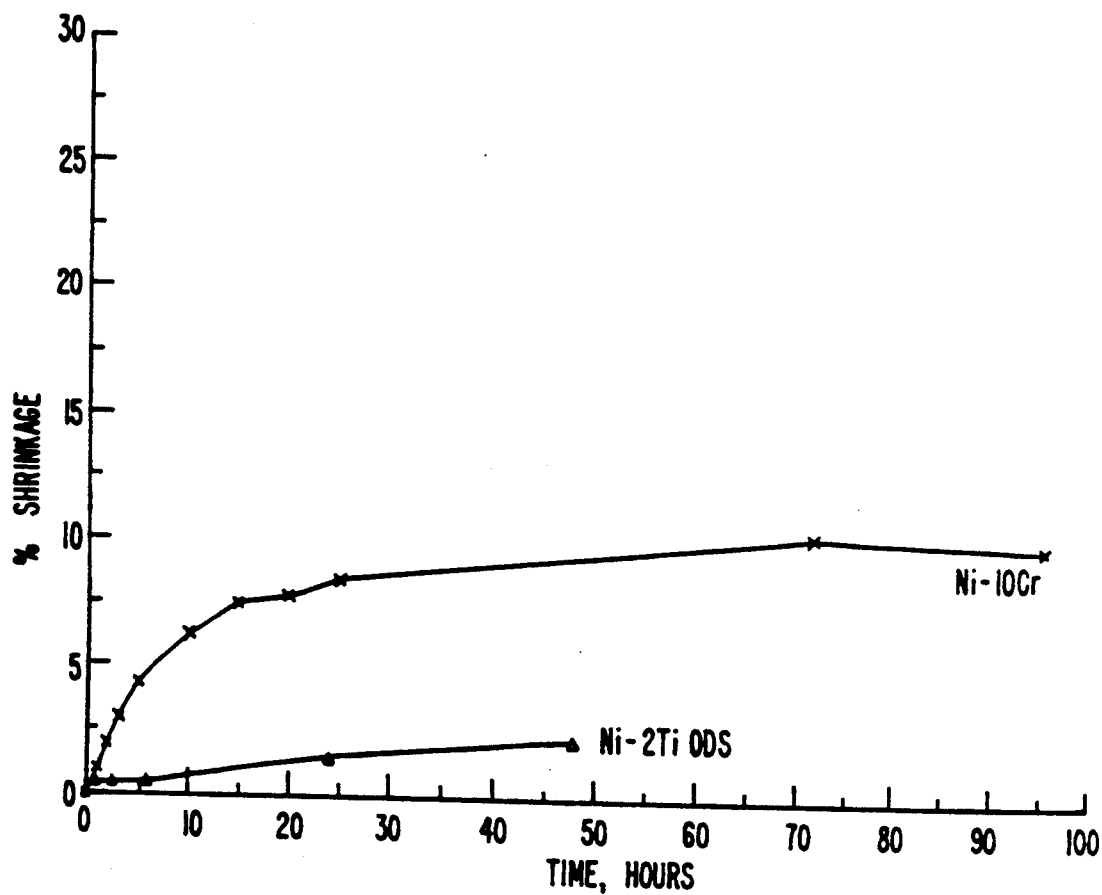
FIG._2.
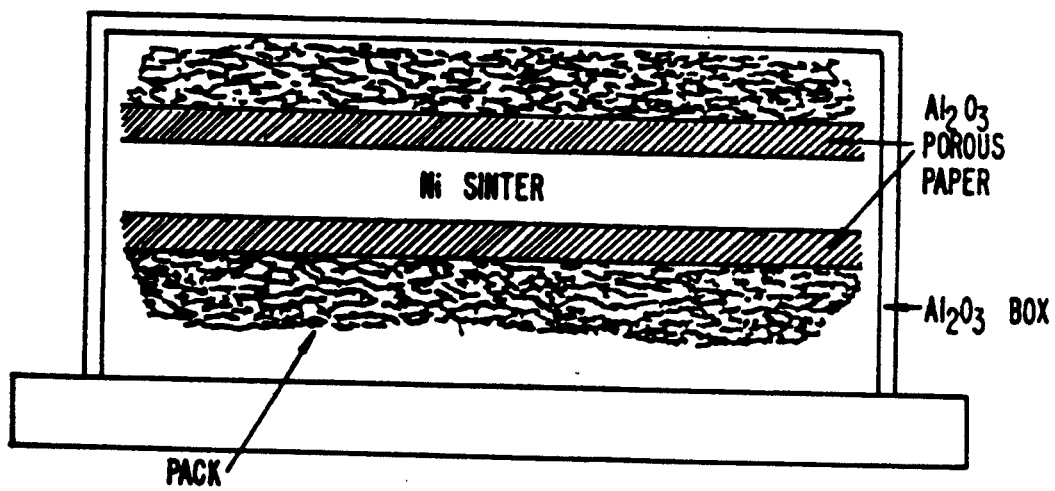
FIG._3.

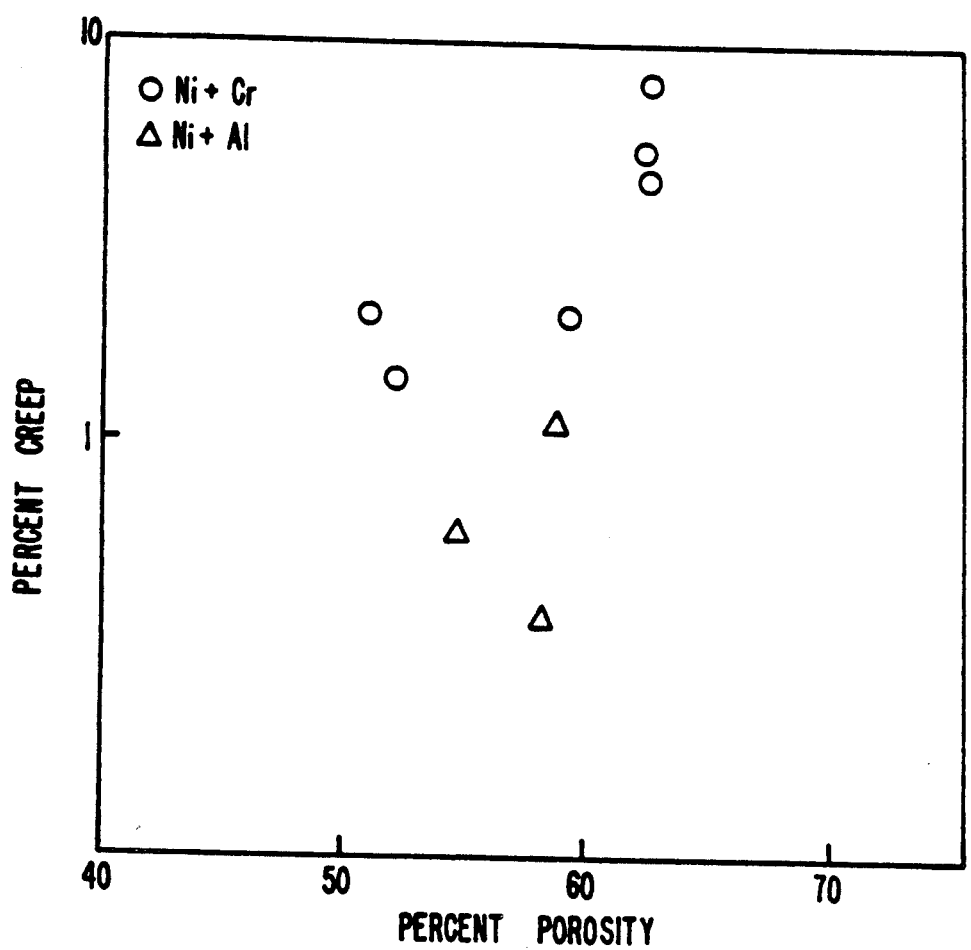
FIG._4.

METHOD FOR FORMING POROUS OXIDE DISPERSION STRENGTHENED CARBONATE FUEL CELL ANODES WITH IMPROVED ANODE CREEP RESISTANCE

FIELD OF THE INVENTION

The present invention is directed to a method for forming porous oxide dispersion strengthened molten carbonate fuel cell anodes having improved anode creep resistance properties.

BACKGROUND OF THE INVENTION

Molten carbonate fuel cells generally comprise two electrodes with their current collectors, a cathode and an anode, an electrolyte tile making contact with both the electrodes, and a cell housing to physically retain the cell components and to provide contacts between the electrodes and the reactant gases. Under fuel cell operating conditions, in the range of about 500° C. to about 700° C., the entire electrolyte tile consisting of the carbonate, and the inert support material, form a paste and thus, the electrolyte diaphragms of this type are known as paste electrolytes. The electrolyte is in direct contact with the electrodes where the three phase reactions (gas-electrolyte-electrode) take place. Hydrogen is consumed in the anode area producing water, carbon dioxide and electrons. The electrons flow to the cathode through an external circuit producing the desired current flow. At the anode, there must be ready entry for the reactant gas, ready exit for the chemical reaction products and ready exit for the product electrons. To maintain a high level of stable performance, both electrolyte and electrode design and properties must be optimize and stabilized at the gas-electrolyte-electrode interface.

Porous anodes of cobalt, copper, or nickel have been previously used in molten carbonate fuel cells. These anodes typically require stabilizing agents to maintain porosity and surface area during fuel cell operation. The stabilizing agents are usually added in about 1–10 weight percent, based upon the metal. The stabilizing particles are dispersed on the base metal surface, prohibiting the structure from sintering at molten carbonate fuel cell temperatures of 500° C. to 700° C.

The molten carbonate fuel cells have typically used nickel, cobalt, and copper-based anode structures. These anodes tend to be dimensionally unstable, losing thickness by creep deformation within the fuel cell stack.

The porous anodes described have problems in that they are prone to creep deformation which occurs as a result of a holding force applied to keep the components in good contact. Creep of electrodes occurs by a combination of at least three different creep mechanisms: particle rearrangement, sintering, and dislocation movement. The surface dispersion of stabilizing particles used in prior art methods does not inhibit creep by dislocation movement. The creep of these anodes under the loaded conditions of a fuel cell stack is not acceptable.

Various methods have been used to attempt to inhibit creep deformation in the anode structures. One method has been to internally oxidize the alloying metal used in the base metal-alloying metal composition typically used to form the porous anode structures.

For example, U.S. Pat. No. 4,315,777 to Nadkarni discloses the internal oxidation of a powder that is precompacted. The powder is a blend of an alloy powder and an oxidant base metal. Upon heat treatment, the alloying metal becomes internally oxidized by oxygen supplied by the metal oxide contained in the oxide powder. Thus, the structure of Nadkarni contains oxidant particles which are, in effect, additives and which provide oxygen for internal oxidation of the alloying metal. This method of dispersion strengthening utilizing an oxidant additive is disadvantageous since the properties of the alloy are compromised by side reactions with the additive which detracts from the performance of the dispersion strengthened alloy. Moreover, the method disclosed in Nadkarni produces a solid, highly dense end product which is not suitable for use as an electrode, which requires high porosity.

U.S. Pat. No. 4,594,217 to Samal discloses a process of forming highly dense bodies from oxide dispersion strengthened powders by cold rolling to a sheet having a density of at least 90% of the theoretical value prior to subsequent heat treatments. Samal uses a metal alloy as a starting material which is already dispersion strengthened and, thus, is not directed to a novel method of dispersion strengthening. Samal utilizes high pressure to bond the particles of the alloy composition together, creating highly dense bodies that are unsuitable for use as electrodes, which require high porosity.

U.S. Pat. No. 4,714,586 to Swarr discloses a method for forming dimensionally stable nickel-chromium anodes by internally oxidizing the alloying metal at high water vapor pressures. The oxygen used to internally oxidize the alloying metal is obtained externally from a gas atmosphere. Swarr is limited to the formation of nickel-chromium anodes.

U.S. Pat. No. 3,525,609 to Roberts discloses a dispersion strengthened copper alloy, which is alloyed with silver, cadmium, or zinc and strengthened by internally oxidized aluminum. The dispersion strengthened alloy is formed by internally oxidizing the alloy. The alloy is surface oxidized at 300° C. and the internal alloying metal is then oxidized by heat treatment in a subsequent step. The alloy of Roberts forms highly dense bodies by the use of high pressure compaction techniques. These bodies are not suitable for use as porous anode structures as they are too dense.

U.S. Pat. No. 3,578,443 to Grant et al. discloses a method for producing an oxide dispersion strengthened alloy by surface oxidizing copper aluminum powder by intensive communition of the powder with an alcohol suspension. The surface oxidized powder is then heat treated in an air tight tube at 750° C. to internally oxidize the entire powder. The communition can deform the powder particles to undesirable shapes, since they are unsuitable for anode microstructure design. The alloy is sintered in a later step. This process produces a highly dense body, unsuitable for use as a porous anode structure.

Thus, it is an object of the present invention to provide a method of preparing a porous anode structure which is dimensionally stable for molten carbonate fuel cell use.

It is a further object of the present invention to provide a method of preparing an anode of nickel and titanium that remains structurally stable with a minimum of creep deformation when in extended use under fuel cell stack conditions.

It is another object of the present invention to provide a method of preparing an anode of nickel and aluminum that remains structurally stable with a minimum of creep deformation when in extended use under fuel cell stack conditions.

It is still another object of the present invention to provide a method of preparing a porous anode structure that has improved creep resistance by internally oxidizing the alloying metal of the base metal-alloying metal composition which forms the alloying powder of the present invention by controlling the oxidation potential of the atmosphere and without using oxidant additives to the alloying powder.

It is a further object of the present invention to provide a method of preparing an oxide dispersion strengthened porous anode by surface oxidizing the alloying metal and base metal of the alloy powder, and subsequently simultaneously internally oxidizing the alloying metal and sintering, in one step, to form the anode structure.

SUMMARY OF THE INVENTION

The present invention is directed to a method for forming porous oxide dispersion strengthened molten carbonate fuel cell anodes having improved anode creep resistance. The method comprises the steps of forming an alloy comprised of a base metal and an alloying metal. The alloy preferably should be in powder form. The alloy powder can then be sintered to form a porous anode structure in a reducing environment. The porous anode structure can then be placed under conditions in which the base metal is reduced and the alloying metal is oxidized, thereby causing internal oxidation of the alloying metal. Internal oxidation of the alloying metal causes submicron oxide particles to form internally and/or externally depending upon alloy content, oxidation temperature, and the partial pressure of oxygen used.

Alternatively, the method of the present invention can comprise the steps of forming an alloy comprised of a base metal and an alloying metal which preferably is in powder form. The alloy powder is then heated under conditions in which the surface of the powder consisting of both base metal and alloying metal is oxidized. The oxidized alloy can then be formed into a porous anode structure by simultaneously sintering and internally oxidizing the alloying metal with the oxide of base metal that formed on the surface of the powder, by virtue of an exchange reaction. An oxygen exchange occurs between the surface of the base metal oxide and the internal alloying metal.

The step of simultaneous sintering and internally oxidizing the alloying metal is preferably performed at a temperature in the range from about 500° C. to about 1,000° C. This step can be performed by heating the surface oxidized alloy powder in an inert atmosphere which can be comprised of $N_2$, Ar, or He. Alternatively, this step can be performed by heat treating the oxidized alloy powder in a vacuum. Another alternative is to heat the oxidized alloy powder in a gas tight container.

The base metal of the present invention can be selected from the group consisting of nickel, copper, and cobalt.

The alloying metal of the present invention can be selected from the group consisting of iron, chromium, aluminum, titanium, silicon, beryllium, magnesium, thorium, and yttrium. Preferably, the alloying metal is present in the range of from about 1–10 weight percent to prevent excessive oxide scale formation.

As the alloy content increases, it becomes increasingly difficult to have exclusive internal oxidation. Once a certain volume fraction of the oxide in the base metal matrix is exceeded, external precipitation of the oxide becomes thermodynamically favored and a transition from internal to external precipitation occurs. At very high alloy contents, and depending on the partial pressure of oxygen, exclusive external oxide precipitation may be favored. Thus, the alloy content is preferably in the range from about 1–10 weight percent to prevent excessive oxide scale formation.

A commercial preformed alloy can be used as the starting material of the present invention. Alternatively, the introduction of the alloying metal to the nickel, cobalt, or copper base metal can be accomplished by tape casting mixtures of nickel, copper, or cobalt base metal and iron, chromium, aluminum, titanium or other oxide forming alloying metal powders and diffusing the alloying metal into the base metal during sintering. Other conventional methods of uniformly dispersing the second-phase alloy throughout the nickel, cobalt, or copper base metal can be used, such as pack cementation of the nickel, cobalt, or copper powders or the use of mechanical alloying, vapor deposition, atomization, plasma spraying or a combination of the above.

Alternatively, the introduction of the alloying metal to the nickel, cobalt or copper base metal can be accomplished after the base metal powder is tape cast and sintered into a coherent porous structure. Alloying can be achieved by vapor deposition or pack cementation.

Internal oxidation of the alloying metal can be performed by placing the anode structure in $H_2/H_2O$ or $CO/CO_2$ gas mixtures which protect the base metal. Alternatively, internal oxidation of the alloying metal can be accomplished by heat treating the anode structure in the presence of a NiO Rhines pack provided at the vicinity of the anode structure. The NiO Rhines pack is a mixture of NiO and Ni and includes some inert particles, such as $Al_2O_3$. The amount of NiO in the pack controls the rate of oxygen supply and hence the internal oxidation behavior of the anode. Other suitable pack compositions may be used as long as it can provide the oxygen partial pressure to internally oxidize the alloy. The pack is usually in a loose powder form, but in this application the powder mixture may be pre-formed into a coherent mass of particles in a sheet form, for convenient handling.

As the oxygen content is lowered, external precipitation becomes more favored. This occurs because the flux of the alloying element diffusing to the external surface becomes greater than the flux of elemental oxygen diffusing inward. If the oxygen partial pressure for oxidation of the base metal is exceeded, an external scale consisting of the base metal oxide, a mixed oxide compound of the base and alloying metals, or a layer of alloy oxide, or a combination of two or more of these oxides will form. Therefore, to prevent these oxides from forming, the ratio of $pH_2O/pH_2$ is preferably in the range from about 1–50.

Preferably, the oxidation temperature should be in the range of from about 500° C. to about 1,000° C., to prohibit sintering of the anode structure before sufficient oxides have formed and to limit the size of the oxide particles.

An alternative method of manufacturing the oxide dispersion strengthened anode structure is to form the alloy powder and then place the powder under conditions in which the powder is oxidized only on its surface, thereby forming oxides of both the base metal and the alloying metal. The oxidized alloy powder is then formed into a porous anode structure by simultaneously sintering and internally oxidizing the remaining unoxidized alloying metal by an oxygen exchange reaction from the surface of the base metal oxide to the internal alloying metal.

The pre-oxidized alloy powder formed by the alternative method can be formed into a porous anode structure by tape casting and then heating the anode structure in the presence of $H_2/H_2O$ or $CO/CO_2$ gas mixtures. Thus, the alloy powder can also be formed into a porous anode structure by tape casting and sintering, or pressing and sintering.

Thus, the final step of forming an oxidized alloy powder into a porous anode structure by simultaneous sintering and internal oxidation of the unoxidized alloying metal can be accomplished, by heating the anode structure formed from the oxidized alloy powder in the presence of $H_2/H_2O$ or $CO/CO_2$ in an inert atmosphere, such as $N_2$, Ar, He, in a vacuum, or in a gas tight container.

The method of the present invention provides oxide dispersion strengthened porous anode structures suitable for use as molten metal carbonate fuel cell porous anode structures. These oxide dispersion strengthened anodes have improved creep resistance and therefore have superior dimensional stability over the anodes known in the prior art.

The following examples are presented by way of illustration and are not intended to limit the scope of the present invention.

EXAMPLE 1

Preparation of Nickel-Titanium Oxide Dispersion Strengthened Porous Anodes 117.6 grams of INCO Ni-255 powder was vibratory mixed with 2.4 grams of Consolidated Astronautics Titanium, 75 grams of methylene chloride, and 54 grams of Cerbind CB-131 binder. The suspension was degassed under vacuum and further rolled in a bottle without balls to eliminate bubbles. The suspension was then tape cast on a teflon substrate using a doctor blade. After drying in air, the resulting tape was approximately 82% porous. The tape was then sintered at approximately 1,050° C. for 20 minutes in 50 $H_2$/50 He atmosphere to remove the binder, sinter the porous structure, and diffuse the titanium alloying metal into the nickel base metal. The sintered tape, which had a porosity of approximately 65% was oxidized for 16 hours at 650° C. in a $pH_2O/pH_2$ ratio of 2:0. The final porosity was approximately 65% which is appropriate for a molten carbonate fuel cell anode.

The anode was creep tested at 100 psi and 650° C. in a molten carbonate and fuel gas environment. Creep tests were performed in a rig whose schematic diagram is shown in FIG. 1. The sample was sandwiched in-between porous $Al_2O_3$ disks housed in a vertical alumina tube. Fuel gas was introduced from the bottom and exit at the top of the tube. Typically, three anode disk samples approximately ⅞ inches in diameter were stacked together in the sample compartment. A carbonate disk having a weight corresponding to the amount of carbonate needed to fill 25% of the electrode pores were placed on top of the anode samples. The samples were heated to the test temperature over a two hour period and soaked at this temperature for 48 hours. A pneumatic pressure was applied to the loading rod from the top. A fuel environment was maintained by flowing in a gas of 60% $H_2$/40% $CO_2$ humidified at 60° C. Creep was monitored by a Kaman KD-2611 displacement measuring device and the total thickness change was checked with a caliper before and after the test. For comparison, the tests were performed at 650° C. and 100 psi. The test period lasted at least 120 hours after which the creep rate had been significantly reduced and stabilized.

FIG. 2 shows the change in thickness measured for state-of-the-art non-oxide dispersion strengthened Ni+10% Cr anodes as described in U.S. Pat. No. 4,247,604 tested in bench-scale (94 sq. cm.) cells, plotted against cell operating period. The nickel-titanium anode exhibited 2% shrinkage in 50 hours versus 10.4% shrinkage for a state-of-the-art Ni-10% Cr anode, as described in U.S. Pat. No. 4,247,604.

EXAMPLE 2

Preparation of Nickel-Aluminum Oxide Dispersion Strengthened Anode

Alloying of nickel and aluminum was performed by pack cementation or by using other known commercial alloying processes to manufacture Ni-Al alloy powders. In the use of pack cementation, a porous alloy anode is made from a porous nickel sinter which is embedded in a pack consisting of an activator salt, a master alloy powder, and an inert filler. Pre-sintered porous nickel plaque weighing 65 grams and having a dimension of 4.75×4.75 sq. inches was sandwiched between two $Al_2O_3$ papers and embedded in a bed of 440 g of $Al_2O_3$, Ni-Al and $NH_4Cl$ mixture in an alumina tray. The tray was covered with an alumina paper forming an unsealed enclosure. The set-up was heated in a muffle furnace where a 10 $H_2$/90 $N_2$ atmosphere was maintained. The heat treatment schedule was:

Ramp to 900° C. in 9 hours

Soak at 900° C. for 8 hours

Ramp to 30° C. at natural rate of the furnace (approximately 100° C. per hour)

The porous nickel plaque had a starting porosity of 76% and a mean pore size of approximately 8 microns. After pack cementation, the porosity decreased to 72.7%. A schematic diagram of the pack cementation procedure for manufacturing the porous nickel-aluminum alloy is shown in FIG. 3.

After alloying the nickel plaque to produce Ni-Al alloy structure, the plaque was then internally oxidized at lower temperatures (600° C.-800° C.) in a humidified environment having a $pH_2O/pH_2$ greater than 20 or in-situ in the fuel cell.

In another embodiment, the nickel-aluminum alloy powder was slightly pre-oxidized for 30 minutes at 650° C. in air and then simultaneously sintered and internally oxidized at temperatures of 500° C.-1,200° C. in a humidified environment having a $pH_2O/pH_2$ greater than 1 for a prolonged period of greater than 10 hours.

FIG. 4 shows the creep properties of the nickel-aluminum anode as being much less than that of a state-of-the-art non-oxide dispersion strengthened nickel-chromium anode as disclosed in U.S. Pat. No. 4,247,604 of comparable porosity. The creep was tested at 650° C., 100 psi for 150 hours as described in Example 1.

TABLE 1

Performance of Cells with Standard Ni + Cr and Ni + 5Al*
Oxide Dispersion Strengthened Anodes at 160 mA/cm$^2$

| Cell I.D. | (Ni + Cr) (mV) | (Ni + 5Al) (mV) |
|---|---|---|
| Cell Potential | 875 | 882 |
| Polarization (IR-free anode) | 40 | 48 |
| Polarization (IR-free cathode) | 60 | 48 |
| IR-drop (resistance) | 80 | 75 |
| OCV (open circuit voltage) | 1055 | 1057 |

*Anode surface treated with LiCrO$_4$.2H$_2$O solution to enhance its wetting characteristics.

Table 1 shows that cell performance of the Ni-Al anode of Example 2 was either comparable or superior to that of the non-oxide dispersion strengthened nickel-chromium anode of comparable porosity as disclosed in U.S. Pat. No. 4,247,604.

What is claimed is:

1. A method for forming porous oxide dispersion strengthened molten carbonate fuel cell anodes having improved anode creep resistance comprising:
   (a) forming a porous plaque of nickel-titanium alloy having between about 1–5 weight percent titanium;
   (b) internally oxidizing said titanium of step (a) without oxidizing said nickel by contacting said plaque with a gas mixture containing hydrogen and steam in a ratio of about 2 volumes steam to about 1 volume hydrogen for at least 10 hours at a temperature in the range from about 600° C. to about 900° C. to form said oxide dispersion strengthened anode.

2. The method of claim 1 wherein forming said porous plaque of nickel-titanium alloy is performed by heat treating a porous mixture of nickel and titanium powder at a temperature in the range from about 800° C. to about 1,200° C. for between about 30 minutes to about 120 minutes.

3. The method of claim 1 wherein said porous plaque of nickel-titanium alloy is formed by heating a mixture of nickel and titanium particles in vacuum or in a reducing atmosphere.

4. The method of claim 3 wherein said reducing atmosphere comprises a H$_2$/He atmosphere.

5. The method of claim 1 wherein said porous plaque has a porosity of from about 40% to about 80%.

6. The method of claim 1 wherein said titanium in said plaque is selectively oxidized by exposure to a pH$_2$O/pH$_2$ atmosphere at a temperature of from about 600° C. to about 900° C.

7. The method of claim 1 wherein said steam:hydrogen volume ratio is in the range from about 1:1 to 50:1.

8. The method of claim 7 wherein said steam:hydrogen volume ratio is about 2:1.

9. The method of claim 1 wherein said porous plaque of nickel-titanium alloy has a composition of about 1–5.0% titanium by weight.

10. The method of claim 1 wherein said porous plaque of nickel-titanium alloy has about 2% shrinkage after heating at 650° C., 100 psi, for approximately 150 hours.

11. A method for forming porous oxide dispersion strengthened molten carbonate fuel cell anodes having improved anode creep resistance comprising:
   (a) forming a porous plaque of nickel-aluminum alloy having between about 1–5 weight percent aluminum;
   (b) internally oxidizing said aluminum without oxidizing said nickel by contacting said plaque with a steam and hydrogen gas mixture in a ratio of about 20 to about 50 volumes steam:hydrogen for at least 10 hours at a temperature in the range from about 600° C. to about 900° C. to form said oxide dispersion strengthened anode.

12. The method of claim 11 wherein said porous plaque has a porosity in the range of from about 40% to about 80%.

13. The method of claim 11 wherein said porous plaque of nickel-aluminum alloy is formed by pack cementation.

14. The method of claim 11 wherein said porous plaque of nickel-aluminum alloy is formed by heating a mixture of nickel and aluminum in a hydrogen containing atmosphere at a temperature from about 800° C. to about 1,200° C.

15. The method of claim 11 wherein said aluminum is selectively oxidized by exposure to a pH$_2$O/pH$_2$ atmosphere at a temperature in the range of from about 600° C. to about 900° C.

16. The method of claim 11 wherein said steam:hydrogen volume ratio is greater than 20.

17. The method of claim 11 wherein said plaque of nickel-aluminum alloy has a composition of about 1–5% aluminum by weight.

18. The method of claim 11 wherein said porous plaque of nickel-aluminum has about 2% shrinkage after heating at 650° C., 100 psi for about 150 hours.

19. The method of claim 11 wherein said porous plaque of nickel-aluminum is formed from preoxidized nickel-aluminum alloy powder.

20. The method of claim 19 wherein said preoxidized nickel-aluminum alloy is formed by heating said alloy for about 30–120 minutes at about 650° C. in air or 15–60 minutes at 800° C.

* * * * *